(12) United States Patent
Luo et al.

(10) Patent No.: US 8,921,513 B2
(45) Date of Patent: Dec. 30, 2014

(54) LOW HALOGEN CONTENT DISULFIDE WASHED POLYARYLENE SULFIDE

(71) Applicant: Ticona LLC, Florence, KY (US)

(72) Inventors: Rong Luo, Florence, KY (US); Xinyu Zhao, Cincinnati, OH (US)

(73) Assignee: Ticona LLC, Florence, KY (US)

( * ) Notice: Subject to any disclaimer, the term of this patent is extended or adjusted under 35 U.S.C. 154(b) by 104 days.

(21) Appl. No.: 13/621,862

(22) Filed: Sep. 18, 2012

(65) Prior Publication Data
US 2013/0072629 A1    Mar. 21, 2013

Related U.S. Application Data

(60) Provisional application No. 61/536,715, filed on Sep. 20, 2011.

(51) Int. Cl.
| | | |
|---|---|---|
| C08J 3/20 | (2006.01) | |
| C08J 3/215 | (2006.01) | |
| C08G 75/14 | (2006.01) | |
| C08L 81/04 | (2006.01) | |
| C08K 7/02 | (2006.01) | |
| C08G 75/02 | (2006.01) | |

(52) U.S. Cl.
CPC . *C08G 75/14* (2013.01); *C08K 7/02* (2013.01); *C08L 81/04* (2013.01); *C08G 75/0254* (2013.01); *C08G 75/0259* (2013.01); *C08G 75/029* (2013.01)
USPC ............ 528/481; 528/489; 528/491; 525/537

(58) Field of Classification Search
CPC .......... C08J 3/097; C08J 7/16; C08J 2381/04; C08L 81/04; C08G 74/14
USPC ............................ 528/481, 489, 491; 525/537
See application file for complete search history.

(56) References Cited

U.S. PATENT DOCUMENTS

| | | |
|---|---|---|
| 3,725,362 A | 4/1973 | Walker |
| 3,729,404 A | 4/1973 | Morgan |
| 4,021,596 A | 5/1977 | Bailey |
| 4,119,617 A | 10/1978 | Hanyuda et al. |
| 4,276,397 A | 6/1981 | Froix |
| 4,605,713 A | 8/1986 | Heitz et al. |
| 4,678,831 A | 7/1987 | Kawabata et al. |
| 4,760,128 A | 7/1988 | Ebert et al. |
| 4,769,424 A | 9/1988 | Takekoshi et al. |
| 4,820,801 A | 4/1989 | Inoue et al. |
| 4,889,893 A | 12/1989 | Kobayashi et al. |
| 4,935,473 A | 6/1990 | Fukuda et al. |
| 5,015,703 A | 5/1991 | Takekoshi et al. |
| 5,015,704 A | 5/1991 | Takekoshi et al. |
| 5,047,465 A | 9/1991 | Auerbach |
| 5,057,264 A | 10/1991 | Bier et al. |
| 5,068,312 A | 11/1991 | Dorf et al. |
| 5,070,127 A | 12/1991 | Auerbach |
| 5,122,578 A | 6/1992 | Han et al. |
| 5,151,458 A | 9/1992 | Heinz et al. |
| 5,182,334 A | 1/1993 | Chen, Sr. et al. |
| 5,218,043 A | 6/1993 | Kubota et al. |
| 5,227,427 A | 7/1993 | Seizawa et al. |
| 5,276,107 A | 1/1994 | Kim et al. |
| 5,384,196 A | 1/1995 | Inoue et al. |
| 5,418,281 A | 5/1995 | Yung et al. |
| 5,436,300 A | 7/1995 | Kashiwadate et al. |
| 5,488,084 A | 1/1996 | Kadoi et al. |
| 5,504,141 A | 4/1996 | Collard et al. |
| 5,541,243 A | 7/1996 | Ohmura et al. |
| 5,652,287 A | 7/1997 | Sullivan et al. |
| 5,654,383 A | 8/1997 | Kohler et al. |
| 5,679,284 A | 10/1997 | Kurita |
| 5,780,583 A | 7/1998 | Lubowitz et al. |
| 5,959,071 A | 9/1999 | DeMoss et al. |
| 5,981,007 A | 11/1999 | Rubin et al. |
| 5,997,765 A | 12/1999 | Furuta et al. |
| 6,001,934 A | 12/1999 | Yamanaka et al. |
| 6,010,760 A | 1/2000 | Miyazaki et al. |
| 6,080,822 A | 6/2000 | Haubs et al. |
| 6,117,950 A | 9/2000 | Yamao et al. |
| 6,130,292 A | 10/2000 | Harwood et al. |
| 6,201,098 B1 | 3/2001 | Haubs et al. |
| 6,280,668 B1 | 8/2001 | Saito et al. |
| 6,317,314 B1 | 11/2001 | Kung et al. |
| 6,339,400 B1 | 1/2002 | Flint et al. |
| 6,476,106 B1 | 11/2002 | Murakami et al. |

(Continued)

FOREIGN PATENT DOCUMENTS

| | | |
|---|---|---|
| CN | 101768358 | 7/2010 |
| CN | 102140233 | 8/2011 |

(Continued)

OTHER PUBLICATIONS

May 21, 2013 International Search Report and Written Opinion of application PCT/US2012/055852.

*Primary Examiner* — Tae H Yoon
(74) *Attorney, Agent, or Firm* — Dority & Manning, P.A.

(57) ABSTRACT

Methods for forming a low chlorine content washed polyarylene sulfide are described. Methods include washing a polyarylene sulfide that includes aryl halide endgroups with a solution that includes a disulfide compound. The solution can also include a catalyst and an organic solvent. During the disulfide wash, a nucleophilic substitution reaction occurs between the disulfide compound and aryl halides endgroups of the polyarylene sulfide. The nucleophilic substitution reaction is carried out at conditions to prevent chain scission of the polyarylene sulfide that includes the aryl halide endgroups. Compositions and products formed with the low chlorine content disulfide washed polyarylene sulfide are also described.

18 Claims, 3 Drawing Sheets

(56) References Cited

U.S. PATENT DOCUMENTS

| | | |
|---|---|---|
| 6,608,136 B1 | 8/2003 | Dean et al. |
| 6,645,623 B2 | 11/2003 | Dean et al. |
| 6,699,946 B1 | 3/2004 | Lambla et al. |
| 6,730,378 B2 | 5/2004 | Matsuoka et al. |
| 6,793,847 B2 | 9/2004 | Maeda et al. |
| 6,830,792 B1 | 12/2004 | Matsuoka et al. |
| 6,875,517 B2 | 4/2005 | Bosshammer et al. |
| 6,889,719 B2 | 5/2005 | Watanabe et al. |
| 6,900,272 B2 | 5/2005 | Matsouka et al. |
| 6,960,628 B2 | 11/2005 | Matsouka et al. |
| 7,115,312 B2 | 10/2006 | Matsuoka et al. |
| 7,118,691 B2 | 10/2006 | Elkovitch et al. |
| 7,169,887 B2 | 1/2007 | Papke |
| 7,235,612 B2 | 6/2007 | Kobayashi et al. |
| 7,271,769 B2 | 9/2007 | Asano et al. |
| 7,301,783 B2 | 11/2007 | Homer et al. |
| 7,303,822 B1 | 12/2007 | Matsuoka et al. |
| 7,385,806 B2 | 6/2008 | Liao |
| 7,462,672 B2 | 12/2008 | Kobayashi et al. |
| 7,486,243 B2 | 2/2009 | Wulff et al. |
| 7,486,517 B2 | 2/2009 | Aapro et al. |
| 7,518,568 B2 | 4/2009 | Tracy et al. |
| 7,553,925 B2 | 6/2009 | Bojkova |
| 7,608,666 B2 | 10/2009 | Matsuoka et al. |
| 7,960,473 B2 | 6/2011 | Kobayashi et al. |
| 7,974,660 B2 | 7/2011 | Hsu et al. |
| 7,989,079 B2 | 8/2011 | Lee et al. |
| 8,005,429 B2 | 8/2011 | Conway et al. |
| 8,026,309 B2 | 9/2011 | Halahmi et al. |
| 8,044,142 B2 | 10/2011 | Akiyama et al. |
| 8,076,423 B2 | 12/2011 | Ishio et al. |
| 8,152,071 B2 | 4/2012 | Doherty et al. |
| 8,168,732 B2 | 5/2012 | Ajbani et al. |
| 8,258,242 B2 | 9/2012 | Hiroi et al. |
| 8,338,547 B2 | 12/2012 | Takahashi et al. |
| 8,367,210 B2 | 2/2013 | Naritomi et al. |
| 8,426,552 B2 | 4/2013 | Hinokimori et al. |
| 8,462,054 B2 | 6/2013 | Yang et al. |
| 2003/0050091 A1 | 3/2003 | Tsai et al. |
| 2004/0257283 A1 | 12/2004 | Asano et al. |
| 2005/0104190 A1 | 5/2005 | Mithal et al. |
| 2006/0257624 A1 | 11/2006 | Naritomi et al. |
| 2009/0011163 A1 | 1/2009 | Ajbani |
| 2009/0267266 A1 | 10/2009 | Lee et al. |
| 2009/0280347 A1 | 11/2009 | Yu |
| 2010/0048777 A1 | 2/2010 | Kodama et al. |
| 2010/0249342 A1 | 9/2010 | Unohara et al. |
| 2011/0037193 A1 | 2/2011 | Takada et al. |
| 2011/0089792 A1 | 4/2011 | Casebolt et al. |
| 2011/0090630 A1 | 4/2011 | Bergeron et al. |
| 2011/0134012 A1 | 6/2011 | Yang et al. |
| 2011/0169700 A1 | 7/2011 | Degner et al. |
| 2012/0065361 A1 | 3/2012 | Konno et al. |
| 2012/0237714 A1 | 9/2012 | Nishikawa et al. |
| 2013/0035440 A1 | 2/2013 | Nishikawa et al. |
| 2013/0059976 A1 | 3/2013 | Matsuo et al. |
| 2013/0069001 A1 | 3/2013 | Luo et al. |
| 2013/0071638 A1 | 3/2013 | Luo et al. |
| 2013/0072630 A1 | 3/2013 | Luo et al. |
| 2013/0225771 A1 | 8/2013 | Kanomata et al. |
| 2013/0249357 A1 | 9/2013 | Luo et al. |

FOREIGN PATENT DOCUMENTS

| | | |
|---|---|---|
| CN | 102181156 | 9/2011 |
| CN | 102532898 | 7/2012 |
| DE | 3813919 | 11/1989 |
| DE | 4138906 | 6/1993 |
| EP | 0405135 | 1/1991 |
| EP | 0432561 | 6/1991 |
| EP | 0546185 | 6/1993 |
| EP | 0549977 | 7/1993 |
| EP | 0568945 | 11/1993 |
| JP | 03-231969 A | 10/1991 |
| JP | 05-086266 A | 4/1993 |
| JP | 08-151518 A | 6/1993 |
| JP | 05-170907 A | 7/1993 |
| JP | 05-230371 A | 9/1993 |
| JP | 11-140315 A | 5/1999 |
| JP | 2980054 B | 11/1999 |
| JP | 3034335 B | 4/2000 |
| JP | 2001-172501 A | 6/2001 |
| JP | 3227729 B | 11/2001 |
| JP | 2004-182754 A | 7/2004 |
| JP | 3579957 B | 10/2004 |
| JP | 3601090 B | 12/2004 |
| JP | 3637715 B | 4/2005 |
| JP | 3800783 B | 7/2006 |
| JP | 2006-316207 A | 11/2006 |
| JP | 3867549 B | 1/2007 |
| JP | 2007-197714 A | 8/2007 |
| JP | 2007-277292 A | 10/2007 |
| JP | 4038607 B | 1/2008 |
| JP | 4129674 B | 8/2008 |
| JP | 4196647 B | 12/2008 |
| JP | 2009-256480 A | 11/2009 |
| JP | 2009-263635 A | 11/2009 |
| JP | 2010-053356 A | 3/2010 |
| JP | 2010-084125 A | 4/2010 |
| JP | 4495261 B | 6/2010 |
| JP | 2010-195874 A | 9/2010 |
| JP | 4552315 B | 9/2010 |
| JP | 4943399 B | 5/2012 |
| JP | 5029881 B | 9/2012 |
| WO | WO 2009/033349 | 3/2009 |

LOW HALOGEN CONTENT DISULFIDE WASHED POLYARYLENE SULFIDE

CROSS REFERENCE TO RELATED APPLICATION

This application claims filing benefit of U.S. Provisional Patent Application Ser. No. 61/536,715 having a filing date of Sep. 20, 2011, which is incorporated herein in its entirety.

BACKGROUND OF THE INVENTION

Polyarylene sulfides are high-performance polymers that may withstand high thermal, chemical, and mechanical stresses and are beneficially utilized in a wide variety of applications. Polyarylene sulfides are generally formed via polymerization of a dihaloaromatic compound such as p-dichlorobenzene with an alkali metal sulfide or an alkali metal hydrosulfide, forming polymers that include a halogen, generally chlorine, at the terminal endgroups. With low halogen content polymers becoming increasingly desired due to environmental concerns, attempts have been made to produce low halogen content polyarylene sulfides.

Post-polymerization washing with conventional materials including water, salt solutions, and/or certain organic solvents has proven effective for removal of ionic chlorine from polyarylene sulfide, but is not adequate for removal of chlorine covalently bound on the polymer chains. Other methods that have been devised for chlorine removal include reaction of the formed polymer at high temperature and pressure conditions. Unfortunately, such methods require process conditions that are not practical or cost effective in industrial applications. In addition, previously known methods can degrade the polymer backbone, which can affect product characteristics.

What are needed in the art are polyarylene sulfides that have a low halogen content, and particularly low chlorine content. In addition, what are needed are facile, straightforward methods for forming low halogen polyarylene sulfides that do not require complicated or extensive processing steps and will not degrade the polymer backbone.

SUMMARY OF THE INVENTION

According to one embodiment, disclosed is a method for forming a disulfide washed polyarylene sulfide. The method includes washing a polyarylene sulfide comprising aryl halide endgroups with a disulfide solution to form the disulfide washed polyarylene sulfide. The disulfide solution can include a disulfide compound. The washing with the disulfide solution can be carried out at a temperature that is less than about 280° C.

Beneficially, the halogen content of the disulfide washed polyarylene sulfide can be less than about 50% of the halogen content of the polyarylene sulfide comprising aryl halide endgroups. For instance, the disulfide washed polyarylene sulfide can have a halogen content of less than about 1000 parts per million.

Also disclosed are compositions including a disulfide washed polyarylene sulfide formed according to the described methods and products formed from the compositions, such as, without limitation, electrical connectors and overmoldings.

BRIEF DESCRIPTION OF THE FIGURES

The present disclosure may be better understood with reference to the following figures.

DETAILED DESCRIPTION

Figure 1:
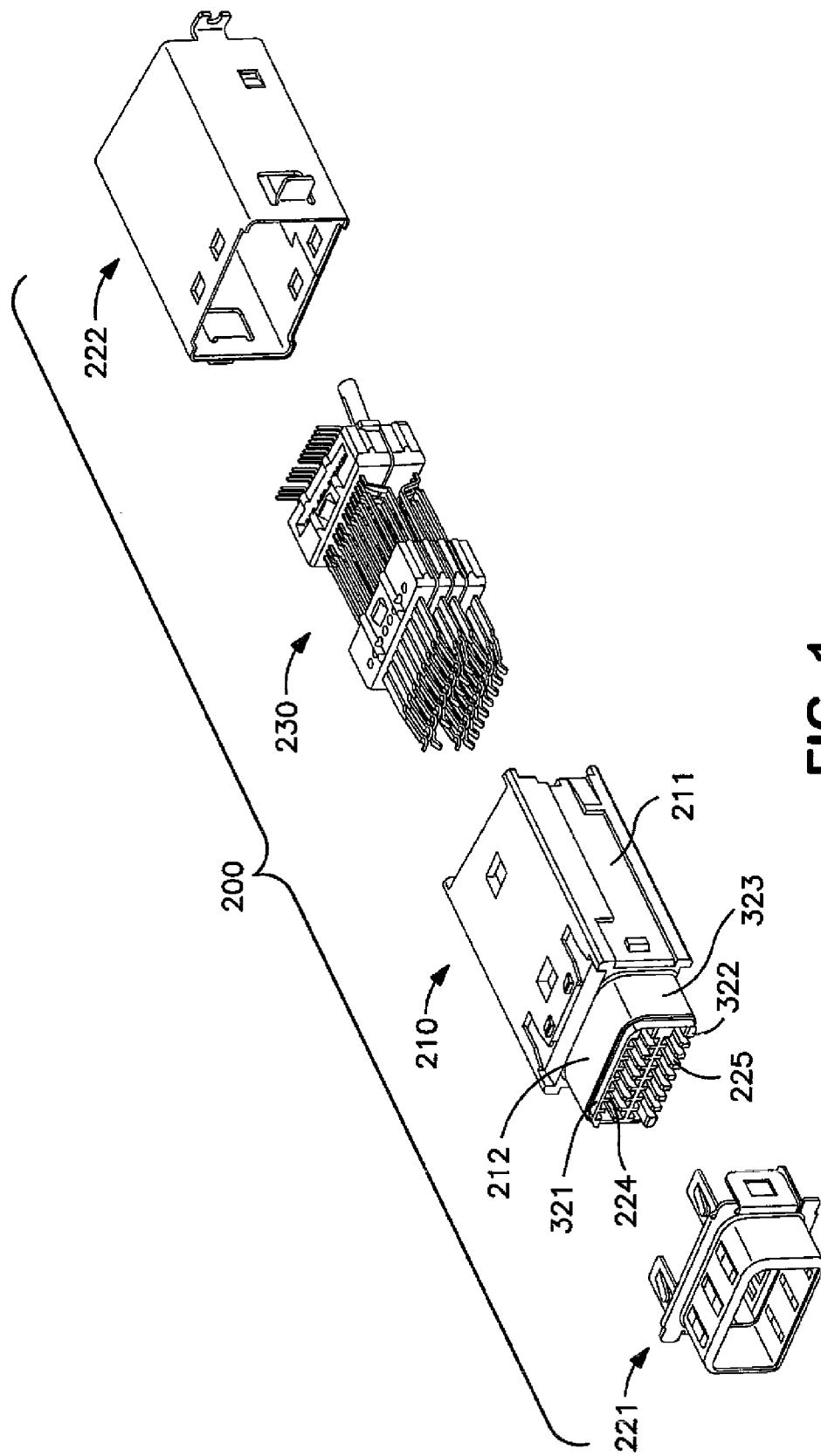
FIG. 1 illustrates an exploded view of an electrical connector as may incorporate a disulfide washed polyarylene sulfide as described herein.

The present disclosure is generally directed to a disulfide washed polyarylene sulfide that has low halogen content and methods for forming the disulfide washed polyarylene sulfide. According to a method, a polyarylene sulfide that includes aryl halide endgroups can be washed with a disulfide solution that includes a disulfide compound. Beneficially, the washing step can take place under normal atmospheric pressure and relatively low temperature conditions, and can be easily incorporated into an existing industrial polymerization process. The disulfide wash with the disulfide solution can lead to removal of halogen, e.g., chlorine, which is covalently bound to the polyarylene sulfide, and can do so with little or no chain scission of the polymer backbone. As such, the molecular weight of the disulfide washed polyarylene sulfide, and hence the melt viscosity of the disulfide washed polyarylene sulfide, can exhibit little or no significant change due to the washing process, i.e., as compared to the 'pre-washed' polyarylene sulfide that includes aryl halide endgroups.

Further processing of the disulfide washed polyarylene sulfide can be straightforward, as the molecular weight-based characteristics of the disulfide washed polyarylene sulfide will remain essentially the same as those of the polyarylene sulfide that includes aryl halide endgroups. A disulfide washed polyarylene sulfide can exhibit low halogen content as well as excellent processability and strength characteristics. Beneficially, a polyarylene sulfide composition that includes the disulfide washed polyarylene sulfide can be used in formation any of a wide variety of products having desirable physical characteristics including a low chlorine content.

While much of the following discussion is directed to low chlorine content disulfide washed polyarylene sulfides, all halogens are encompassed herein, and the compounds and methods of this disclosure are in no way limited to the halogen chlorine.

A polyarylene sulfide that includes aryl halide endgroups may be a thioether that contains repeat units of the formula (I):

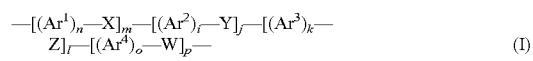

$$—[(Ar^1)_n—X]_m—[(Ar^2)_i—Y]_j—[(Ar^3)_k—Z]_l—[(Ar^4)_o—W]_p— \quad (I)$$

wherein $Ar^1$, $Ar^2$, $Ar^3$, and $Ar^4$ are the same or different and are arylene units of 6 to 18 carbon atoms; W, X, Y, and Z are the same or different and are bivalent linking groups selected from $—SO_2—$, $—S—$, $—SO—$, $—CO—$, $—O—$, $—COO—$ or alkylene or alkylidene groups of 1 to 6 carbon atoms and wherein at least one of the linking groups is $—S—$; and n, m, i, j, k, l, o, and p are independently zero or 1, 2, 3, or 4, subject to the proviso that their sum total is not less than 2. The arylene units $Ar^1$, $Ar^2$, $Ar^3$, and $Ar^4$ may be selectively substituted or unsubstituted. Advantageous arylene systems are phenylene, biphenylene, naphthylene, anthracene and phenanthrene. The polyarylene sulfide that includes aryl halide endgroups typically includes more than about 30 mol %, more than about 50 mol %, or more than about 70 mol % arylene sulfide (—S—) units. In one embodiment the polyarylene sulfide that includes aryl halide endgroups includes more than about 85 mol % sulfide linkages attached directly to two aromatic rings.

In one embodiment the polyarylene sulfide that includes aryl halide endgroups is a polyphenylene sulfide, defined herein as containing the phenylene sulfide structure —$(C_6H_4$—$S)_n$—(wherein n is an integer of 1 or more) as a component thereof.

The disulfide solution used to wash the polyarylene sulfide that includes terminal aryl halide endgroups can include a disulfide compound, a catalyst, and an organic solvent.

The disulfide compound can either be provided to the disulfide solution in the disulfide form or may be generated from thiol compounds provided to the disulfide solution. In the latter case, the thiol compounds can be oxidized within the disulfide solution, for example in the presence of air, to form the disulfide compound prior to the washing step. During the disulfide wash, a nucleophilic substitution reaction can take place that can cleave aryl halide endgroups from the polyarylene sulfide and thereby decrease the halogen content of the polyarylene sulfide.

The disulfide compound may have the structure of formula (II):

$$R^1-S-S-R^2 \qquad (II)$$

wherein $R^1$ and $R^2$ may be the same or different and are hydrocarbon groups that independently include from 1 to about 20 carbons. For instance, $R^1$ and $R^2$ may be independently an alkyl, cycloalkyl, aryl, or heterocyclic group.

$R^1$ and $R^2$ may include reactive functionality at the terminal ends of the disulfide compound. For example, at least one of $R^1$ and $R^2$ may include a terminal carboxyl group, hydroxyl group, a substituted or non-substituted amino group, a nitro group, or the like. Examples of disulfide compounds including reactive terminal groups as may be included in a disulfide solution may include 2,2'-diaminodiphenyl disulfide, 3,3'-diaminodiphenyl disulfide, 4,4'-diaminodiphenyl disulfide, dibenzyl disulfide, dithiosalicyclic acid, dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole) and 2-(4'-morpholinodithio)benzothiazole.

In one embodiment, the disulfide compound may include nonreactive functionality at the terminal ends. For instance, the $R^1$ and $R^2$ groups may be the same or different and may be nonreactive groups independently selected from the group consisting of alkyl, cycloalkyl, aryl, and heterocyclic groups of 1 to about 20 carbon atoms. Examples of disulfide compounds including nonreactive terminal groups as may be included in a disulfide solution include, without limitation, diphenyl disulfide, naphthyl disulfide, dimethyl disulfide, diethyl disulfide, dipropyl disulfide, di(benzothiazol-2-yl) disulfide, and the like.

Thiol compounds that may be included in a disulfide solution can include those that may oxidize to form disulfide compounds as described above. Thiol compounds can include, without limitation, alkylthiols such as methanethiol, ethanthiol, and so forth; thiophenol and derivatives thereof such as amino thiophenol, 3-(dimethylamino)thiophenol, 4-(dimethylamino)thiophenol, 2-phenylthiophenol, 4-phyenylthiophenol, 2,4-dimethoxythiophenol, 4-mercaptophenol, and so forth. Mixtures of two or more different thiol compounds may also be included in the disulfide solution.

The disulfide solution may include the disulfide compound in an amount of from about 1 to about 10 parts per hundred parts of the polyarylene sulfide that includes aryl halide endgroups that is to be washed by the disulfide solution, or from about 3 to about 6 parts per hundred parts of the polyarylene sulfide that includes aryl halide endgroups.

In addition to the disulfide compound, the disulfide solution can also include a catalyst to encourage the nucleophilic substitution of the disulfide with aryl halide endgroups of the polyarylene sulfide. The catalyst can generally be any compound that can encourage the nucleophilic substitution reaction. For example, the catalyst can be an alkali metal hydroxide that can provide hydroxide ion. Alkali metal hydroxide catalysts can include, without limitation, sodium hydroxide, calcium hydroxide, potassium hydroxide, lithium hydroxide, magnesium hydroxide, or mixtures thereof.

The disulfide solution may include the catalyst in an amount of from about 1 to about 10 parts per hundred parts of the polyarylene sulfide that includes aryl halide endgroups to be washed by the disulfide solution, or from about 3 to about 6 parts per hundred parts of the polyarylene sulfide that includes aryl halide endgroups.

The disulfide compound (or thiol compound) and catalyst can be combined with an organic solvent to form the disulfide solution. The organic solvent can be an organic solvent that will not decompose the polyarylene sulfide that includes aryl halide endgroups. Organic solvents can include, without limitation, nitrogen-containing polar solvents such as N-methyl-2-pyrrolidone, dimethylformamide, dimethylacetamide, 1,3-dimethylimidazolidinone, hexamethylphosphoramide, and piperazinone; sulfoxide and sulfone solvents such as dimethyl sulfoxide, dimethylsulfone, and sulfolane; ketone solvents such as acetone, methyl ethyl ketone, diethyl ketone, and acetophenone, ether solvents such as diethyl ether, dipropyl ether, dioxane, and tetrahydrofuran; halogen-containing hydrocarbon solvents such as chloroform, methylene chloride, ethylene dichloride, trichloroethylene, perchloroethylene, monochloroethane, dichloroethane, tetrachloroethane, perchloroethane, and chlorobenzene; alcohol and phenol solvents such as methanol, ethanol, propanol, butanol, pentanol, ethylene glycol, propylene glycol, phenol, cresol, polyethylene glycol, and polypropylene glycol; and aromatic hydrocarbon solvents such as benzene, toluene, and xylene. Further, organic solvents can be used alone or as a mixture of two or more.

The disulfide solution may include the organic solvent in an amount of from about 500 to about 3000 parts per hundred parts of the polyarylene sulfide that includes aryl halide endgroups to be washed by the disulfide solution, or from about 1000 to about 2000 parts per hundred parts of the polyarylene sulfide that includes aryl halide endgroups.

According to one embodiment, the polyarylene sulfide that includes aryl halide endgroups can be combined with the disulfide solution in a ratio of from about 50 grams of polyarylene sulfide that includes aryl halide endgroups per liter of disulfide solution to about 200 grams of polyarylene sulfide that includes aryl halide endgroups per liter of disulfide solution, for instance about 100 grams of polyarylene sulfide that includes aryl halide endgroups per liter of disulfide solution.

Washing with the disulfide solution can be carried out by immersing the polyarylene sulfide that includes aryl halide endgroups in the disulfide solution and heating and stirring as appropriate. The washing temperature (i.e., temperature of the disulfide solution during the disulfide wash) can generally be less than about 280° C., in some embodiments less than about 230° C., and in some embodiments, less than about 20° C. to about 230° C. Higher washing temperatures should be avoided so as to prevent chain scission of the polyarylene sulfide backbone during the disulfide wash. However, washing efficiency can be increased with an elevation of the washing temperature. For instance a washing temperature can be from about 150° C. to about 220° C. The disulfide wash can generally be carried out at atmospheric pressure, but this is not a requirement of the disulfide wash.

The disulfide wash time can generally vary with the temperature of the disulfide wash, with lower temperature disulfide washes being carried out for a longer period of time. In general, the disulfide wash can be carried out for about 5 minutes or more, usually under agitation. For example, the disulfide wash can be carried out for a period of time between about 30 minutes and about 12 hours, or between about 1 hour and about 5 hours. Batchwise disulfide washing is not a requirement, and the disulfide wash can be performed in a continuous manner.

In one embodiment, the disulfide wash can be followed by one or more water washes that can include hot water washing and/or warm water washing. For instance, the residual disulfide solution can be removed by a water wash after the disulfide wash with the disulfide solution. In general, distilled water or deionized water can be used for a water wash.

The temperature of a hot water wash can be at or above about 100° C., for instance higher than about 120° C., higher than about 150° C., or higher than about 170° C. In one embodiment, a hot water wash can be conducted by adding a predetermined amount of the disulfide washed polyarylene sulfide to a predetermined amount of water and heating the mixture under stirring in a pressure vessel. By way of example, a hot water wash ratio of up to about 200 grams of disulfide washed polyarylene sulfide per liter of water can be used in a hot water wash. Following a hot water wash, the disulfide washed polyarylene sulfide can be water washed several times with warm water, maintained at a temperature of from about 10° C. to about 100° C. A water wash can be carried out in an inert atmosphere to avoid deterioration of the disulfide washed polyarylene sulfide.

Additional washes that can be carried out can include a salt wash with a salt solution, and/or an acidic wash with an acidic solution such as acetic acid or hydrochloric acid as is generally known in the art. An acid wash and/or an acidic wash may reduce the sodium, lithium and/or calcium metal ion end group concentration of the polyarylene sulfide.

The specific order of the different possible washes is not critical to the method. For instance, a water wash, a salt wash and/or an acidic wash can take place either prior to or subsequent to the disulfide wash with the disulfide solution.

The disulfide wash with the disulfide solution can reduce the chlorine content of the polyarylene sulfide that includes aryl halide endgroups. For instance, the chlorine content of the disulfide washed polyarylene sulfide can be less than about 50%, less than about 25%, less than about 20%, or less than about 10%, of the halogen content of the polyarylene sulfide that includes aryl halide endgroups. For instance, the disulfide washed polyarylene sulfide can have a chlorine content of less than about 1000 ppm, less than about 900 ppm, less than about 600 ppm, or less than about 400 ppm. Moreover, the low chlorine content can be obtained about without any substantial loss in molecular weight of the polyarylene sulfide that includes aryl halide endgroups. For example, the molecular weight (either number average or weight average molecular weight) of the disulfide washed polyarylene sulfide can be greater than about 90%, greater than about 95%, or greater than about 98%, of the same type of molecular weight of the polyarylene sulfide that includes aryl halide endgroups that was disulfide washed. For instance, in those embodiments in which a high melt viscosity polyarylene sulfide that includes aryl halide endgroups is disulfide washed, the disulfide washed polyarylene sulfide will maintain the high melt viscosity following the disulfide wash.

The disulfide washed polyarylene sulfide can exhibit other beneficial characteristics as well. For instance, the disulfide washed polyarylene sulfide can exhibit good heat resistance and flame retardant characteristics. For instance, the disulfide washed polyarylene sulfide can meet the V-0 flammability standard at a thickness of 0.8 millimeters. The flame retarding efficacy may be determined according to the UL 94 Vertical Burn Test procedure of the "Test for Flammability of Plastic Materials for Parts in Devices and Appliances", 5th Edition, Oct. 29, 1996. The ratings according to the UL 94 test are listed in the following table:

TABLE 1

| Rating | Afterflame Time (s) | Burning Drips | Burn to Clamp |
| --- | --- | --- | --- |
| V-0 | <10 | No | No |
| V-1 | <30 | No | No |
| V-2 | <30 | Yes | No |
| Fail | <30 | | Yes |
| Fail | >30 | | No |

The "afterflame time" is an average value determined by dividing the total afterflame time (an aggregate value of all samples tested) by the number of samples. The total afterflame time is the sum of the time (in seconds) that all the samples remained ignited after two separate applications of a flame as described in the UL-94 VTM test. Shorter time periods indicate better flame resistance, i.e., the flame went out faster. For a V-0 rating, the total afterflame time for five (5) samples, each having two applications of flame, must not exceed 50 seconds. Using the flame retardant of the present invention, articles may achieve at least a V-1 rating, and typically a V-0 rating, for specimens having a thickness of 0.8 millimeters.

The polyarylene sulfide that includes the aryl halide endgroups can be purchased or can be synthesized prior to the disulfide washing process, as desired. For instance, polyarylene sulfides that include aryl halide endgroups are available from Ticona Engineering Polymers of Florence, Ky.

In those embodiments that encompass synthesis of the polyarylene sulfide that includes aryl halide endgroups, synthesis techniques that may be used are generally known in the art. For instance, the polyarylene sulfide can be synthesized according to a heterogeneous formation process or a homogeneous formation process, as are generally known in the art. By way of example, a synthesis technique can include reacting a material that provides a hydrosulfide ion, e.g., an alkali metal sulfide, with a dihaloaromatic compound. The reaction can take place in an organic amide solvent. The polymer can be formed by a series of nucleophilic displacement reactions of the hydrosulfide ion with aryl halides of the dihaloaromatic compound. In general, the amount of the dihaloaromatic compound per mole of the effective amount of the charged alkali metal sulfide can be from 1.0 to 2.0 moles, from 1.05 to 2.0 moles, or from 1.1 to 1.7 moles. As the diaholaromatic compound is used in excess, the polyarylene sulfide can include aryl halide endgroups.

The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene; 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone.

The halogen atom can be fluorine, chlorine, bromine or iodine, and 2 halogen atoms in the same dihalo-aromatic compound may be the same or different from each other. In one embodiment, o-dichlorobenzene, m-dichlorobenzene, p-dichlorobenzene or a mixture of 2 or more compounds thereof is used as the dihalo-aromatic compound.

As is known in the art, it is also possible to use a monohalo compound (not necessarily an aromatic compound) in combination with the dihaloaromatic compound in order to form endgroups of the polymer (or copolymer) or to regulate the polymerization reaction and/or the molecular weight of the polymer.

The polyarylene sulfide that includes aryl halide endgroups may be a copolymer. By a suitable, selective combination of the dihaloaromatic compounds, a copolymer can be formed containing not less than two different reaction units. For instance, in the case where p-dichlorobenzene is used in combination with m-dichlorobenzene or 4,4'-dichlorodiphenylsulfone, a copolymer can be formed containing segments having the structure of formula (III):

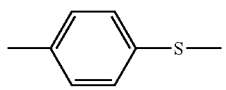

(III)

and segments having the structure of formula (IV):

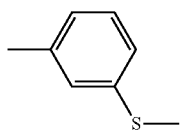

(IV)

or segments having the structure of formula (V):

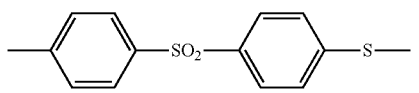

(V)

In another embodiment, a polyarylene sulfide copolymer that includes aryl halide endgroups may include a first segment with a number-average molar mass Mn of from 1000 to 20,000 g/mol that includes first units that have been derived from structures of the formula (VI):

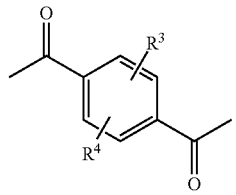

(VI)

where the radicals $R^3$ and $R^4$, independently of one another, are a hydrogen, fluorine, chlorine or bromine atom or a branched or unbranched alkyl or alkoxy radical having from 1 to 6 carbon atoms; and/or second units that are derived from structures of the formula (VII):

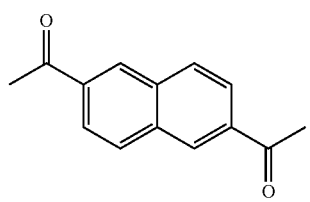

(VII)

The first unit may be p-hydroxybenzoic acid or one of its derivatives, and the second unit may be composed of 2-hydroxynaphthalene-6-carboxylic acid.

A copolymer can include a second segment derived from a polyarylene sulfide structure of the formula (VIII):

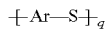

(VIII)

where Ar is an aromatic radical, or more than one condensed aromatic radical, and q is a number from 2 to 100, in particular from 5 to 20. The radical Ar in formula (VIII) may be a phenylene or naphthylene radical. In one embodiment, the second segment may be derived from poly(m-thiophenylene), from poly(o-thiophenylene), or from poly(p-thiophenylene).

The first segment of the copolymer may include both the first and second units. The first and second units may be arranged with random distribution or in alternating sequence in the first segment. The molar ratio of the first and second units in the first segment may be from 1:9 to 9:1.

As stated, a process for producing the polyarylene sulfide that includes aryl halide endgroups can include carrying out the polymerization reaction in an organic amide solvent. Exemplary organic amide solvents used in a polymerization reaction can include, without limitation, N-methyl-2-pyrrolidone; N-ethyl-2-pyrrolidone; N,N-dimethylformamide; N,N-dimethylacetamide; N-methylcaprolactam; tetramethylurea; dimethylimidazolidinone; hexamethyl phosphoric acid triamide and mixtures thereof. The amount of the organic amide solvent used in the reaction can be, e.g., from 0.2 to 5 kilograms per mole (kg/mol) of the effective amount of the charged alkali metal sulfide.

The polymerization can be carried out by a step-wise polymerization process. The first polymerization step can include introducing the dihaloaromatic compound to a reactor, and subjecting the dihaloaromatic compound to a polymerization reaction in the presence of water at a temperature of from about 180° C. to about 235° C., or from about 200° C. to about 230° C., and continuing polymerization until the conversion rate of the dihaloaromatic compound attains to not less than 50 mol % of the theoretically necessary amount.

When carrying out the first polymerization step, the alkali metal sulfide, which usually includes water, can be charged into the organic amide solvent and the mixture can be heated to distill the excessive water out of the reaction system. At that time, a part of the alkali metal sulfide will decompose to form an alkali and hydrogen sulfide ($H_2S$). From the generated amount of $H_2S$, the effective amount of the charged alkali metal sulfide is calculated. Thereafter, the dihaloaromatic compound can be charged into the reaction system in an amount calculated from the effective amount of the charged alkali metal sulfide and the mixture can be heated to a temperature of from about 180° C. to about 235° C. in an inert atmosphere, generating the polymerization reaction.

The termination of the first polymerization is the point wherein the conversion rate of the dihaloaromatic compound in the reaction system reaches more than about 50 mol %, more than about 70 mol %, or more than about 90 mol % of the theoretical conversion. The theoretical conversion of the dihaloaromatic compound can be calculated from one of the following formulas:

(a) In the case wherein the dihaloaromatic compound (hereinafter referred to as DHA) has been added in excess (by molar ratio) of the alkali metal sulfide:

$$\text{Conversion rate} = \frac{X - Y}{X - Z} \times 100$$

(b) In the cases other than (a):

$$\text{Conversion rate} = \frac{X - Y}{X} \times 100$$

wherein X is the amount of the charged dihaloaromatic compound; Y is the remaining amount of the dihaloaromatic compound and Z is the excessive amount of dihaloaromatic compound in moles.

In a second polymerization step, water is added to the reaction slurry so that the total amount of water in the polymerization system is increased to about 7 moles, or to about 5 moles, per mole of the effective amount of the charged alkali metal sulfide. Following, the reaction mixture of the polymerization system can be heated to a temperature of from about 250° C. to about 290° C., from about 255° C. to about 280° C., or from about 260° C. to about 270° C. and the polymerization can continue until the melt viscosity of the thus formed polymer is raised to the desired final level. The duration of the second polymerization step can be, e.g., from about 0.5 to about 20 hours, or from about 1 to about 10 hours.

The polyarylene sulfide that includes aryl halide endgroups may be linear, semi-linear, branched or crosslinked. A linear polyarylene sulfide includes as the main constituting unit the repeating unit of —(Ar—S)—. In general, a linear polyarylene sulfide may include about 80 mol % or more of this repeating unit. A linear polyarylene sulfide that includes aryl halide endgroups may include a small amount of a branching unit or a cross-linking unit, but the amount of branching or cross-linking units may be less than about 1 mol % of the total monomer units of the polyarylene sulfide. A linear polyarylene sulfide that includes aryl halide endgroups may be a random copolymer or a block copolymer containing the above-mentioned repeating unit.

A semi-linear polyarylene sulfide that includes aryl halide endgroups may be utilized that may have a cross-linking structure or a branched structure provided by introducing into the polymer a small amount of one or more monomers having three or more reactive functional groups. For instance between about 1 mol % and about 10 mol % of the polyarylene sulfide that includes aryl halide endgroups may be formed from monomers having three or more reactive functional groups. Methods that may be used in making semi-linear polyarylene sulfide that includes aryl halide endgroups are generally known in the art. By way of example, monomer components used in forming a polyarylene sulfide that includes aryl halide endgroups can include an amount of polyhaloaromatic compounds having 2 or more halogen substituents per molecule which can be utilized in preparing branched polymers. Such monomers can be represented by the formula $R'X_n$, where each X is selected from chlorine, bromine, and iodine, n is an integer of 3 to 6, and R' is a polyvalent aromatic radical of valence n which can have up to about 4 methyl substituents, the total number of carbon atoms in R' being within the range of 6 to about 16. Examples of some polyhaloaromatic compounds having more than two halogen substituted per molecule that can be employed in forming a semi-linear polyarylene sulfide that includes aryl halide endgroups include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

The polymerization reaction apparatus is not especially limited, although it is typically desired to employ an apparatus that is commonly used in formation of high viscosity fluids. Examples of such a reaction apparatus may include a stirring tank type polymerization reaction apparatus having a stirring device that has a variously shaped stirring blade, such as an anchor type, a multistage type, a spiral-ribbon type, a screw shaft type and the like, or a modified shape thereof. Further examples of such a reaction apparatus include a mixing apparatus commonly used in kneading, such as a kneader, a roll mill, a Banbury mixer, etc. Following polymerization, the molten polyarylene sulfide that includes aryl halide endgroups may be discharged from the reactor, typically through an extrusion orifice fitted with a die of desired configuration. For instance, the melt may be discharged through a perforated die to form strands that are taken up in a water-based bath, pelletized and dried. The polyarylene sulfide that includes aryl halide endgroups may also be in the form of a strand, granule, or powder.

Following formation, a polyarylene sulfide that includes aryl halide endgroups may be disulfide washed with the disulfide wash as previously described.

The disulfide washed polyarylene sulfide can be combined with one or more additives as are generally known in the art and processed according to standard practice to form a polyarylene sulfide composition. However, it should be understood that the disulfide wash can take place at any point in the formation of a polyarylene sulfide composition. For instance, in one embodiment, the polyarylene sulfide that includes aryl halide endgroups can be combined with one or more additives to form a polyarylene sulfide composition, and the disulfide wash can then take place such that the polyarylene sulfide composition is disulfide washed.

In general, a polyarylene sulfide composition can include the disulfide washed polyarylene sulfide or the polyarylene sulfide that includes aryl halide endgroups in an amount from about 40 wt. % to about 90 wt. % by weight of the polyarylene sulfide composition, for instance from about 45% wt. % to about 80 wt. % by weight of the polyarylene sulfide composition.

Additives can include a fibrous filler, and impact modifier, a mineral filler, and the like, or a combination of additives. By way of example, a polyarylene sulfide composition can include a fibrous filler in an amount of from about 5 wt. % to about 70 wt. %, or from about 20 wt. % to about 65 wt. % by weight of the composition. The fibers are typically of a length from about 0.5 mm to about 5.0 mm.

A fibrous filler may include one or more fiber types including, without limitation, polymer fibers, glass fibers, carbon fibers, metal fibers, and so forth, a combination of fiber types. In one embodiment, the fibers may be chopped glass fibers or glass fiber rovings (tows). Fibers can be of any suitable size and can be chopped or continuous fibers, as are generally known. For instance, fibers can have a diameter of less than about 100 μm and can have an initial length of from about 3 mm to about 5 mm. Fibers may be pretreated with a sizing that may facilitate mixing with the disulfide washed polyarylene sulfide or the polyarylene sulfide that includes aryl halide endgroups during formation of a polyarylene sulfide composition.

In one embodiment, the fibers may have a high yield or small K numbers. The tow is indicated by the yield or K number. For instance, glass fiber tows may have 50 yield and up, for instance from about 115 yield to about 1200 yield.

A polyarylene sulfide composition can include an organosilane coupling agent. The organosilane coupling agent may be an alkoxy silane coupling agent as is known in the art. The alkoxysilane compound may be at least one silane compound selected from the group consisting of vinlyalkoxysilanes, epoxyalkoxysilanes, aminoalkoxysilanes, and mercaptoalkoxysilanes. Examples of the vinylalkoxysilane that may be utilized include vinyltriethoxysilane, vinyltrimethoxysilane and vinyltris(β-methoxyethoxy)silane. Examples of the epoxyalkoxysilanes that may be used include γ-glycidoxypropyltrimethoxysilane, β-(3,4-epoxycyclohexyl)ethyltrimethoxysilane and γ-glycidoxypropyltriethoxysilane. Examples of the mercaptoalkoxysilanes that may be employed include γ-mercaptopropyltrimethoxysilane and γ-mercaptopropyltriethoxysilane.

Amino silane compounds that may be used in a polyarylene sulfide composition are typically of the formula: $R^5$—Si—$(R^6)_3$, wherein $R^5$ is selected from the group consisting of an amino group such as $NH_2$; an aminoalkyl of from about 1 to about 10 carbon atoms, or from about 2 to about 5 carbon atoms, such as aminomethyl, aminoethyl, aminopropyl, aminobutyl, and so forth; an alkene of from about 2 to about 10 carbon atoms, or from about 2 to about 5 carbon atoms, such as ethylene, propylene, butylene, and so forth; and an alkyne of from about 2 to about 10 carbon atoms, or from about 2 to about 5 carbon atoms, such as ethyne, propyne, butyne and so forth; and wherein $R^6$ is an alkoxy group of from about 1 to about 10 atoms, or from about 2 to about 5 carbon atoms, such as methoxy, ethoxy, propoxy, and so forth.

In one embodiment, $R^5$ is selected from the group consisting of aminomethyl, aminoethyl, aminopropyl, ethylene, ethyne, propylene and propyne, and $R^6$ is selected from the group consisting of methoxy groups, ethoxy groups, and propoxy groups. In another embodiment, $R^5$ is selected from the group consisting of an alkene of from about 2 to about 10 carbon atoms such as ethylene, propylene, butylene, and so forth, and an alkyne of from about 2 to about 10 carbon atoms such as ethyne, propyne, butyne and so forth, and $R^6$ is an alkoxy group of from about 1 to about 10 atoms, such as methoxy group, ethoxy group, propoxy group, and so forth. A mixture of various aminosilanes may also be used.

Some representative examples of amino silane coupling agents that may be used include aminopropyl triethoxy silane, aminoethyl triethoxy silane, aminopropyl trimethoxy silane, aminoethyl trimethoxy silane, ethylene trimethoxy silane, ethylene triethoxy silane, ethyne trimethoxy silane, ethyne triethoxy silane, aminoethylaminopropyltrimethoxy silane, 3-aminopropyl triethoxy silane, 3-aminopropyl trimethoxy silane, 3-aminopropyl methyl dimethoxysilane or 3-aminopropyl methyl diethoxy silane, N-(2-aminoethyl)-3-aminopropyl trimethoxy silane, N-methyl-3-aminopropyl trimethoxy silane, N-phenyl-3-aminopropyl trimethoxy silane, bis(3-aminopropyl)tetramethoxy silane, bis(3-aminopropyl) tetraethoxy disiloxane, and combinations thereof. The amino silane may also be an aminoalkoxysilane, such as γ-aminopropyltrimethoxysilane, γ-aminopropyltriethoxysilane, γ-aminopropylmethyldimethoxysilane, γ-aminopropylmethyldiethoxysilane, N-(β-aminoethyl)-γ-aminopropyltrimethoxysilane, N-phenyl-γ-aminopropyltrimethoxysilane, γ-diallylaminopropyltrimethoxysilane and γ-diallylaminopropyltrimethoxysilane. One suitable amino silane is 3-aminopropyltriethoxysilane which is available from Degussa, Sigma Chemical Company, and Aldrich Chemical Company.

When present, the polyarylene sulfide composition may include the organosilane coupling agent in an amount from about 0.1 wt. % to about 5 wt. % by weight of the polyarylene sulfide composition, from about 0.3 wt. % to about 2 wt. % by weight of the polyarylene sulfide composition, or from about 0.2 wt. % to about 1 wt. % by weight of the polyarylene sulfide composition.

The polyarylene sulfide composition can include an impact modifier. In one embodiment, the impact modifier may comprise a random copolymer of polyethylene and glycidyl methacrylate. The amount of glycidyl methacrylate contained in the random copolymer may vary. In one particular embodiment, the random copolymer contains the glycidyl methacrylate in an amount from about 6% to about 10% by weight of the copolymer.

Other impact modifiers as may be utilized include polyurethanes, two-phase mixtures of polybutadiene and styreneacrylonitrile (ABS), modified polysiloxanes or silicone rubbers, or graft copolymers of an elastomeric, single-phase core based on polydiene and of a hard graft shell (core-shell structure).

When considering graft copolymer impact modifiers, the impact modifiers are composed of particles most of which, for instance more than 70% of which, have a structure composed of a core and one or more shells. The core can be formed from an elastomeric polymer phase onto which has been grafted the hard shell, which may be composed of two or more layers. The core is generally a single-phase of the elastomeric soft phase and includes only small amounts of, if any, hard polymer constituents of the shell. The graft copolymer can be composed of from 40 to 95% by weight, from 60 to 90% by weight, or from 70 to 80% by weight, of the elastomeric core. The proportion of the shells can be from 5 to 60% by weight, from 10 to 40% by weight, or from 20 to 30% by weight.

Other impact modifiers encompassed herein include polyurethanes, e.g., thermoplastic polyurethanes. Polyurethane impact modifiers are prepared in a known manner via polyaddition of polyisocyanates, in particular diisocyanates, polyesters, polyethers, polyesteramides, polyacetals, or other suitable hydroxy or amino compounds, e.g. hydroxylated polybutadiene, or mixtures of the abovementioned compounds. Where appropriate, use is also made of chain extenders, such as low-molecular-weight polyols, in particular diols, polyamines, in particular diamines, or water.

An impact modifier may further improve the physical characteristics of a polyarylene sulfide composition. For example, in one embodiment, the impact modifier can present in a polyarylene sulfide composition in an amount sufficient to raise the Izod notched strength of the polyarylene sulfide composition.

In one embodiment, the polyarylene sulfide composition can include one or more mineral fillers in an amount of from about 1 wt. % to about 50 wt. % of the polyarylene sulfide composition. Mineral fillers may include, without limitation, silica, quartz powder, silicates such as calcium silicate, aluminum silicate, kaolin, talc, mica, clay, diatomaceous earth and wollastonite, and so forth.

Still other additives that can be incorporated in a polyarylene sulfide composition can include, without limitation, antimicrobials, pigments, lubricants, antioxidants, stabilizers, surfactants, waxes, flow promoters, solid solvents, and other materials added to enhance properties and processability. Such optional materials may be employed in conventional amounts.

A polyarylene sulfide composition may be processed according to techniques known in the art. For example, the various components of the polyarylene sulfide composition may be combined and melt-kneaded in a single-screw or multi-screw extruder at a temperature of from about 250° C. to about 320° C. In one embodiment, the components may be melt processed in an extruder that includes multiple temperature zones. For instance, the components may be melt processed in an extruder that includes a temperature zone that is maintained at a temperature of between about 250° C. and about 320° C.

By way of example, a mixture including the disulfide washed polyarylene sulfide and one or more additives may be melt mixed using twin screw extruder such as a Leistritz 18 mm co-rotating fully intermeshing twin screw extruder. An extruder may have multiple temperature control zones, e.g., about 6 temperature control zones (including at the extrusion die), and an overall L/D of 30. A general purpose screw design can be used to compound the various components into the composition. In one embodiment, all components may be fed to the feed throat in the first barrel by means of a volumetric feeder. In another embodiment, different components may be added at different addition points in the extruder, as is known. The polyarylene sulfide composition can be melted and mixed then extruded through a die. The extruded polyarylene sulfide composition can then be quenched in a water bath to solidify and granulated in a pelletizer followed by drying, e.g., drying at about 120° C.

Conventional shaping processes for forming articles out of the polyarylene sulfide compositions include, without limitation, extrusion, injection molding, blow-molding, thermoforming, foaming, compression molding, hot-stamping, fiber spinning and so forth. Shaped articles that may be formed may include structural and non-structural shaped parts, for instance for appliances, electrical materials, electronic products, fibrous webs, and automotive engineering thermoplastic assemblies. Exemplary automotive shaped plastic parts are suitable for under the hood applications, including fan shrouds, supporting members, wire and cable jacketing, covers, housings, battery pans, battery cases, ducting, electrical housings, fuse buss housings, blow-molded containers, nonwoven or woven geotextiles, baghouse filters, membranes, pond liners, to name a few. Other useful articles besides moldings, extrusion and fibers include wall panels, overhead storage lockers, serving trays, seat backs, cabin partitions, window covers, and electronic packaging handling systems such as integrated circuit trays.

The polyarylene sulfide compositions can be used in a variety of electrical and electronics applications in which a low chlorine content is desirable. For instance, utilization of the polyarylene sulfide compositions in the formation of connectors and over-molding (insert-molding) parts is encompassed. The low chlorine content polyarylene sulfide compositions are beneficial in a variety of connector applications.

Figure 2:
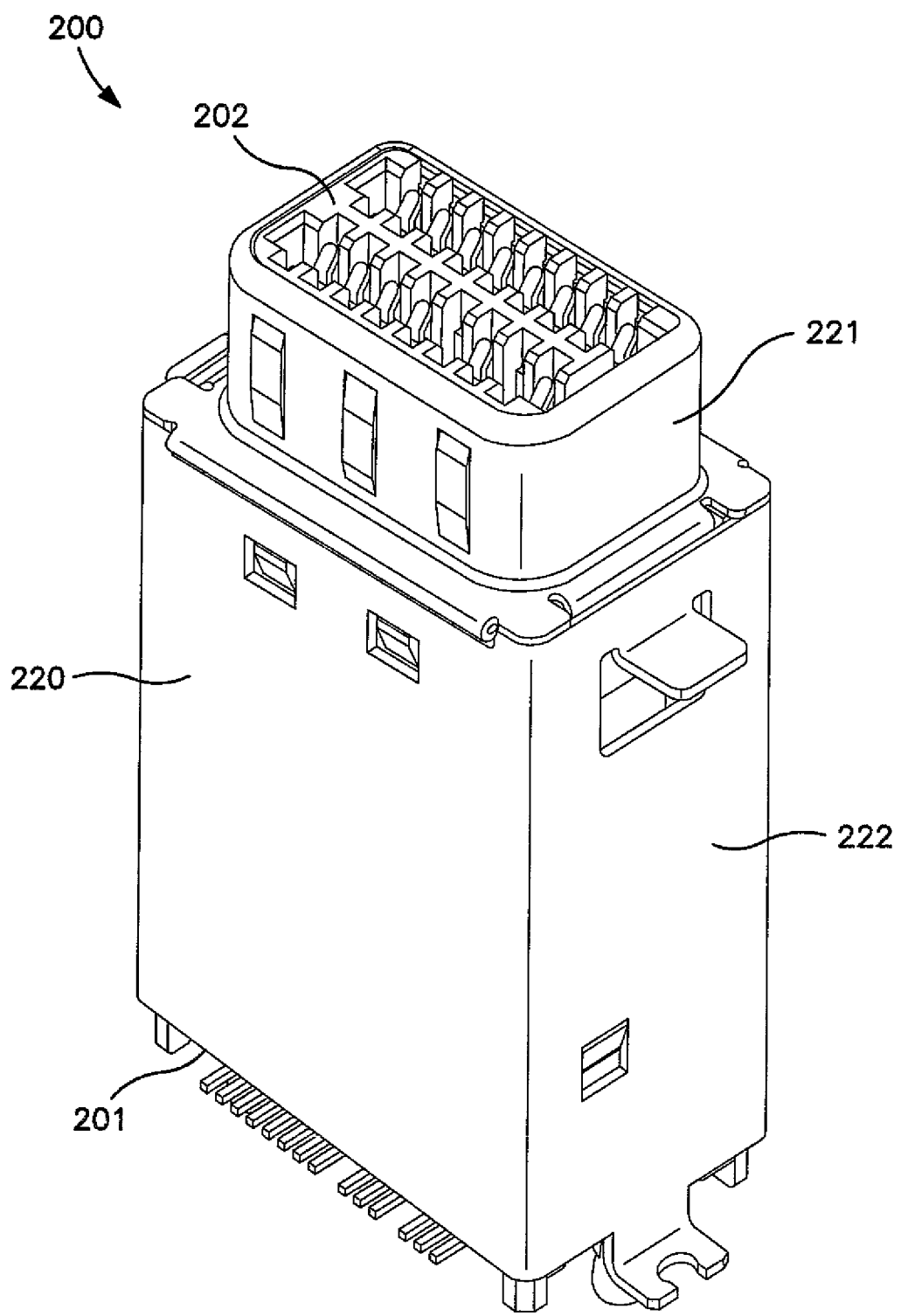
FIG. 2 is the electrical connector of FIG. 1 as formed.

According to one embodiment, a composition including a disulfide washed polyarylene sulfide can be utilized in forming an electrical connector. Referring to FIGS. 1-2, an electrical connector 200, for instance as may be utilized for mounting to a printed circuit board (not shown) can be formed. Electrical connector 200 includes an insulative housing 210, a plurality of contact modules 230 inserted into the insulative housing 210, and a shield 220 that encloses the insulative housing 210. The electrical connector 200 is straight and defines a mounting face 201 parallel to a top face of the printed circuit board and a mating face 202 opposite to the mounting face 201.

The insulative housing 210 and the shield 220 can each be a one-piece structure unitarily molded of a disulfide washed polyarylene sulfide, e.g., a composition including a disulfide washed polyarylene sulfide, that can be the same or different from one another. The shield 220 can be a two-piece structure which includes a first shell 221 and a second shell 222, and each shell can be formed of the same or different composition including a disulfide washed polyarylene sulfide as described herein. The insulative housing 210 has a base portion 211 and a rectangular mating port 212 extending upwardly from the base portion 211 for mating with a complementary plug (not shown) in an up to down direction. The base portion 211 defines a downwardly facing longitudinal cavity for receiving the plurality of contact modules 230 therein. The mating port 212 of the insulative housing 210 has a front wall 321, a back wall 322 parallel to the front wall 321, and a pair of sidewalls 323 connected the front and the back wall 321, 322. The mating port 212 includes a tongue plate 224 paralleled to the front and back wall 321, 322 and extending therebetween. Passageways 225 allow for contact between the contact modules 230 and the circuit board.

The polyarylene sulfide compositions are useful to form an overmolding that includes a coating of the polyarylene sulfide composition on a metal body. The metal body may be any one of various metal bases or a metal base with an undercoat formed in advance with an inorganic material and/or an organic material.

The metal base material can include, without limitation, aluminum, iron, titanium, chromium, nickel, and alloys containing at least one of these metals, for example, duralumin, carbon steel and stainless steel can provide heat resistance, corrosion resistance, adhesion properties, mechanical characteristics, economy and the like.

The overmolding can be formed by providing at least one coating layer of a polyarylene sulfide composition on the metal base. By way of example, the coating process can include a pretreatment of the metal base that is conducted prior to the formation of the coating layer. A pretreatment can improve adhesion between the metal base and the coating layer. Pretreatment generally includes cleaning, surface roughening or surface modification, or a combination thereof.

Cleaning can be carried out with a detergent, a solvent, an acid or an alkali, or a removal treatment of rust or burrs with a derusting agent, by a physical method (sand blasting, honing or the like) or a high-temperature heating treatment. Surface roughening can be, e.g., a chemical roughening treatment with an oxidizing agent, electrolytic oxidation or a physical method such as sand blasting. Surface modification can improve the adhesion of the metal base to the coating layer. It can be include a surface oxidation treatment (e.g., with an oxidizing agent, or by electrolytic oxidation or high-temperature oxidation), a surface-nitriding treatment, or a surface-hydroxylating treatment (by steaming).

Optionally, an undercoat may be applied, for instance to reduce the difference in the coefficient of linear expansion between the metal base and the coating layer, to improve the adhesion between the metal base and the coating layer, and to prevent corrosion of the metal base upon its coating treatment. When included, an undercoat may include inorganic material layers such as ceramic layers, glass layers and cermet layers as well as resin layers of the same kind as the coating layer or of a kind different from the coating layer. Methods for coating may include, without limitation, slurry coating, powder coating, fluidized bed coating and electrostatic coating.

Following pretreatment and formation of any undercoat layer(s), a polyarylene sulfide composition can be coated on the metal base to form a coating layer. The coating layer can be formed according to any standard coating method as is generally known in the art including, without limitation, slurry coating, powder coating, fluidized bed coating and electrostatic coating.

Depending on the application purpose of the overmolding, a coating layer of a kind different from the layer of the polyarylene sulfide composition and any undercoat may be applied additionally as an intermediate coating layer or a topcoat. For instance, a topcoat layer of a fluoroplastic or fluorinated resin composition can be formed on the polyarylene sulfide coating layer.

An overmolding may be used in a wide variety of applications, such as components for automobiles, trucks, commercial airplanes, aerospace, rail, household appliances, computer hardware, hand held devices, recreation and sports, structural component for machines, structural components for buildings, etc.

Wireless electronic devices are particularly suitable. For example, the overmolding may serve as a housing for a wireless electronic device. In such embodiments, an antenna may be disposed on and/or within the metal component prior to overmolding. The metallic component itself may also be used as part of the antenna. For example, portions of the metal component may be shorted together to form a ground plane in or to expand a ground plane structure that is formed from a planar circuit structure, such as a printed circuit board structure (e.g., a printer circuit board structure used in forming antenna structures). Alternatively, the antenna may also be embedded within the composition including a disulfide washed polyarylene sulfide during the molding process. Other discrete components can also be embedded within the composition including a disulfide washed polyarylene sulfide, such as metal stampings, bushings, electromechanical parts, filtration materials, metal reinforcement and other discrete parts that are combined into a single unitary component through the injection of thermoplastic around the carefully placed parts.

Examples of suitable wireless electronic devices may include a desktop computer or other computer equipment, a portable electronic device, such as a laptop computer or small portable computer of the type that is sometimes referred to as "ultraportables." In one suitable arrangement, the portable electronic device may be a handheld electronic device. Examples of portable and handheld electronic devices may include cellular telephones, media players with wireless communications capabilities, handheld computers (also sometimes called personal digital assistants), remote controls, global positioning system ("GPS") devices, and handheld gaming devices. The device may also be a hybrid device that combines the functionality of multiple conventional devices. Examples of hybrid devices include a cellular telephone that includes media player functionality, a gaming device that includes a wireless communications capability, a cellular telephone that includes game and email functions, and a handheld device that receives email, supports mobile telephone calls, has music player functionality and supports web browsing.

Figure 3:
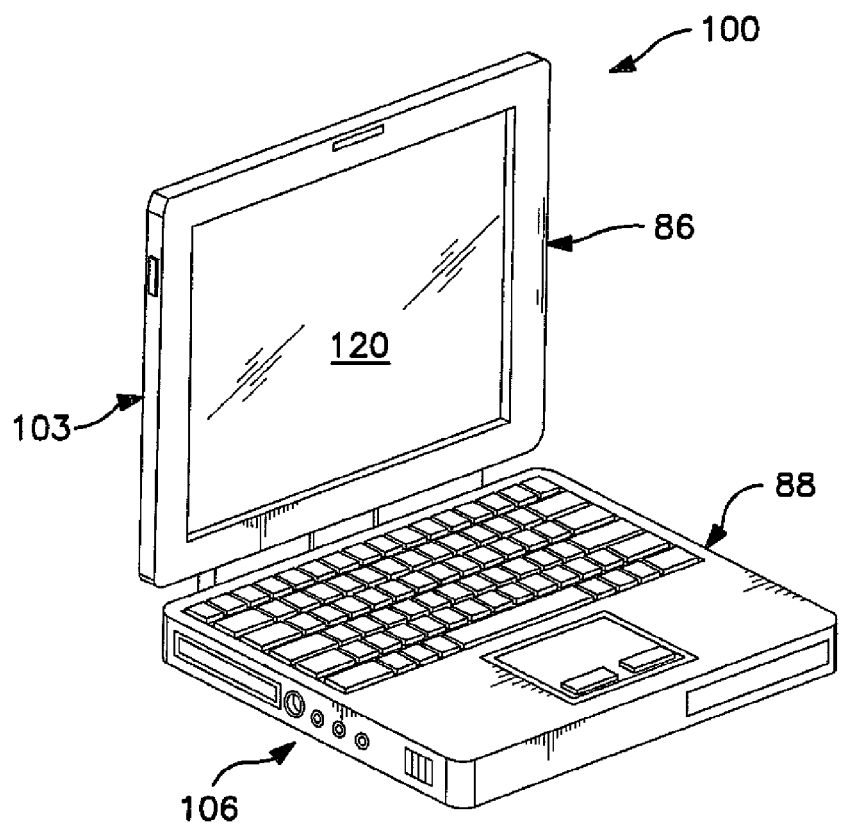
FIG. 3 is a perspective view of an electronic device that contains an overmolding that includes a disulfide washed polyarylene sulfide in accordance with one embodiment of the present disclosure.
Figure 4:
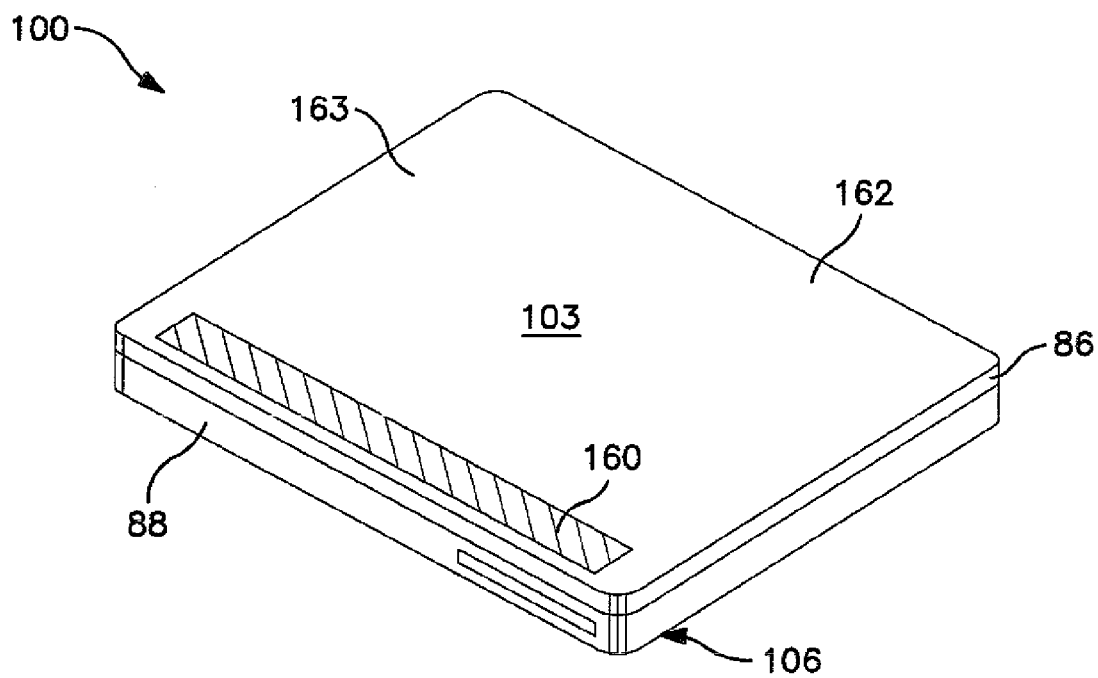
FIG. 4 is a perspective view of the electronic device of FIG. 3, shown in a closed configuration.

Referring to FIGS. 3-4, one particular embodiment of a wireless electronic device 100 is shown as a laptop computer. The electronic device 100 includes a display member 103 rotatably coupled to a base member 106. The display member 103 may be a liquid crystal diode (LCD) display, an organic light emitting diode (OLED) display, a plasma display, or any other suitable display. The display member 103 and the base member 106 each contain a housing 86 and 88, respectively, for protecting and/or supporting one or more components of the electronic device 100. The housing 86 may, for example, support a display screen 120 and the base member 106 may include cavities and interfaces for various user interface components (e.g. keyboard, mouse, and connections to other peripheral devices).

The overmolding may generally be employed to form any portion of the electronic device 100. In most embodiments, however, the overmolding is employed to form all or a portion of the housing 86 and/or 88. For example, the housing 86 shown in FIG. 3 is formed from the overmolding and contains a composition including a disulfide washed polyarylene sulfide 160 adhered to an interior surface (not shown) of a metal component 162. In this particular embodiment, the composition including a disulfide washed polyarylene sulfide 160 is in the form of a strip, which may optionally cover an antenna (not shown) located in the housing 86. Of course, the antenna and/or composition including a disulfide washed polyarylene sulfide 160 may be disposed at other locations of the housing 86, such as adjacent to a corner, along an edge, or in any other suitable position. Regardless, the resulting overmolding formed by the composition including disulfide washed polyarylene sulfide 160 and the metal component 162 defines an exterior surface 163 of the housing 86. The exterior surface 163 is generally smooth, and is indicated above, has a similar color and visual appearance.

Although not expressly shown, the device 100 may also contain circuitry as is known in the art, such as storage, processing circuitry, and input-output components. Wireless transceiver circuitry in circuitry may be used to transmit and receive radio-frequency (RF) signals. Communications paths such as coaxial communications paths and microstrip communications paths may be used to convey radio-frequency signals between transceiver circuitry and antenna structures. A communications path may be used to convey signals between the antenna structure and circuitry. The communications path may be, for example, a coaxial cable that is connected between an RF transceiver (sometimes called a radio) and a multiband antenna.

Test Methods

Melt Viscosity:

The melt viscosity is reported as scanning shear rate viscosity. Scanning shear rate viscosity as reported herein was determined in accordance with ISO Test No. 11443 (technically equivalent to ASTM D3835) at a shear rate of $1200\ s^{-1}$ and at a temperature of 310° C. using a Dynisco 7001 capillary rheometer. The rheometer orifice (die) had a diameter of 1 mm, a length of 20 mm, an L/D ratio of 20.1, and an entrance angle of 180°. The diameter of the barrel was 9.55 mm±0.005 mm and the length of the rod was 233.4 mm.

Chlorine Content:

Chlorine content was determined according to an elemental analysis using Parr Bomb combustion followed by Ion Chromatography.

Melt Stability:

The melt stability was determined in accordance with ISO Test No. 11443 (technically equivalent to ASTM D3835). The test was performed at 310° C. and at a constant shear rate.

Molecular Weight:

Weight average molecular weight (Mw) and number average molecular weight (Mw) were determined by gel permeation chromatography. (Polydispersity Index (PDI)=Mw/Mn)

Embodiments of the present disclosure are illustrated by the following examples that are merely for the purpose of illustration of embodiments and are not to be regarded as limiting the scope of the invention or the manner in which it may be practiced. Unless specifically indicated otherwise, parts and percentages are given by weight.

Example 1

Polyphenylene sulfide flake (Fortron® 0203 polyphenylene sulfide available from Ticona Engineering Polymers) was washed with disulfide solution. Two different disulfide solutions were utilized. The first disulfide solution included 100 mL N-methyl-2-pyrrolidone, 0.5 g sodium hydroxide, and 0.4 g di(benzothiazol-2-yl)disulfide (Vulkacit® DM/c available from Lanxess). The second disulfide solution included the same solvent and catalyst, in the same amounts, but utilized a different disulfide—0.4 g diphenyl disulfide.

The experimental procedure included combination of 10 g of the polyphenylene sulfide flake with one of the two disulfide solutions in a three-neck round bottom flask equipped with a condenser and a magnetic stir bar. The system was purged with nitrogen for 1-2 minutes. Heating was carried out in a 200° C. oil bath under agitation. After 2 hours, the heating was stopped and the reaction mixture was cooled to room temperature. The solids were removed and washed with large quantities of water until the pH was about 7. The solids were then washed with isopropanol and vacuum dried overnight at 45° C. prior to obtaining the physical characteristics shown in Table 1, below. Sample no. 1 was unwashed PPS flake. Sample no. 2 was the flake of Sample no. 1 following washing with the first disulfide solution that contained the di(benzothiazol-2-yl)disulfide. Sample no. 3 was another sample of unwashed PPS flake, and Sample no. 4 was the flake of Sample no. 3 following washing with the second disulfide solution that contained the diphenyl sulfide.

TABLE 1

| Sample No. | Mn | Mw | PDI | Chlorine content (ppm) | Melt viscosity (poise) | Melt stability (% loss per minute) |
|---|---|---|---|---|---|---|
| 1 | 21107 | 45075 | 2.14 | 3200 | 268 | 3.66 |
| 2 | 20874 | 45770 | 2.19 | 780 | 369 | 3.85 |
| 3 | 37651 | 37651 | 2.07 | 2800 | — | — |
| 4 | 18382 | 34226 | 1.86 | 1350 | — | — |

As can be seen, the disulfide wash process decreased the chlorine content of the polyphenylene sulfide without degradation of the polymer.

While certain representative embodiments and details have been shown for the purpose of illustrating the subject invention, it will be apparent to those skilled in this art that various changes and modifications may be made therein without departing from the scope of the subject invention.

What is claimed is:

1. A method for decreasing the halogen content of a polyarylene sulfide comprising:
    washing a polyarylene sulfide composition comprising (a) a polyarylene sulfide comprising aryl halide endgroups and (b) one or more additives with a disulfide solution to form a disulfide washed polyarylene sulfide composition comprising a disulfide washed polyarylene sulfide and the one or more additives, the one or more additives comprising a fibrous filler, the disulfide solution including a disulfide compound and an organic solvent, the washing being carried out at a temperature that is less than 280° C. and at atmospheric pressure, the organic solvent being an organic solvent that will not decompose the polyarylene sulfide; wherein
    the halogen content of the disulfide washed polyarylene sulfide is less than 50% of the halogen content of the polyarylene sulfide comprising aryl halide endgroups, and wherein the disulfide washed polyarylene sulfide has a halogen content of less than 1000 parts per million.

2. The method according to claim 1, wherein the organic solvent is N-methyl-2-pyrrolidone.

3. The method according to claim 1, the disulfide solution including a catalyst, wherein the catalyst promotes a nucleophilic substitution reaction between the disulfide compound and the aryl halide endgroups of the polyarylene sulfide comprising aryl halide endgroups.

4. The method according to claim 3, wherein the catalyst is an alkali metal hydroxide.

5. The method according to claim 1, further comprising reacting a dihaloaromatic compound with a material that provides a hydrosulfide ion to form the polyarylene sulfide comprising aryl halide endgroups.

6. The method according to claim 1, wherein the disulfide washed polyarylene sulfide is a polyphenylene sulfide.

7. The method according to claim 1, wherein the disulfide washed polyarylene sulfide is a copolymer.

8. The method according to claim 1, wherein the disulfide washed polyarylene sulfide is a linear polyarylene sulfide.

9. The method according to claim 1, wherein the disulfide compound has the following structure:

$$R^1-S-S-R^2$$

wherein $R^1$ and $R^2$ are the same or different and are hydrocarbon groups that independently include from 1 to about 20 carbons.

10. The method according to claim 9, wherein $R^1$ and $R^2$ are independently selected from alkyl, cycloalkyl, aryl, or heterocyclic groups.

11. The method according to claim 1, further comprising forming the disulfide solution.

12. The method according to claim 11, wherein formation of the disulfide solution includes combining a thiol compound with the organic solvent, the thiol compound oxidizing to form the disulfide compound in the disulfide solution.

13. The method according to claim 1, wherein the disulfide solution includes from about 1 to about 10 parts disulfide compound per 100 parts of the polyarylene sulfide comprising aryl halide endgroups.

14. The method according to claim 1, wherein the disulfide solution includes from about 1 to about 10 parts catalyst per 100 parts of the polyarylene sulfide comprising aryl halide endgroups.

15. The method according to claim 1, wherein the disulfide solution includes from about 500 to about 3000 parts solvent per 100 parts of the polyarylene sulfide comprising aryl halide endgroups.

16. The method according to claim 1, wherein the polyarylene sulfide comprising aryl halide endgroups is combined with the disulfide solution for the washing in a ratio of from about 50 grams to about 200 grams of the polyarylene sulfide comprising aryl halide endgroups per liter of the disulfide solution.

17. The method according to claim 1, wherein the halogen content of the disulfide washed polyarylene sulfide is less than 10% of the halogen content of the polyarylene sulfide comprising aryl halide endgroups.

18. The method according to claim 1, wherein the one or more additives further comprises an impact modifier, a mineral filler, an organosilane coupling agent, or a combination thereof.

* * * * *